(12) United States Patent
Ramanujan et al.

(10) Patent No.: US 6,791,739 B2
(45) Date of Patent: Sep. 14, 2004

(54) ELECTRO-OPTIC DESPECKLING MODULATOR AND METHOD OF USE

(75) Inventors: Sujatha Ramanujan, Pittsford, NY (US); Andrew F. Kurtz, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 80 days.

(21) Appl. No.: 09/924,619

(22) Filed: Aug. 8, 2001

(65) Prior Publication Data

US 2003/0030880 A1 Feb. 13, 2003

(51) Int. Cl.[7] .............................................. G02F 1/01
(52) U.S. Cl. ...................................................... 359/279
(58) Field of Search ................................ 359/245, 254, 359/279, 271, 283, 323, 247

(56) References Cited

U.S. PATENT DOCUMENTS

| | | | |
|---|---|---|---|
| 3,490,827 A | 1/1970 | vanLigten | 359/32 |
| 3,588,217 A | 6/1971 | Mathisen | 359/32 |
| 3,633,999 A | 1/1972 | Buckles | 359/577 |
| 3,650,608 A | 3/1972 | Baker | 353/69 |
| 3,851,515 A | 12/1974 | Hautau | 72/121 |
| 4,011,403 A | 3/1977 | Epstein et al. | 348/370 |
| 4,033,683 A | 7/1977 | Tancredi | 353/7 |
| 4,035,068 A | 7/1977 | Rawson | 353/122 |
| 4,143,943 A | 3/1979 | Rawson | 359/446 |
| 4,201,473 A | 5/1980 | Domenicali et al. | 356/514 |
| 4,256,363 A | 3/1981 | Briones | 359/33 |
| 4,511,220 A | 4/1985 | Scully | 359/495 |
| 4,521,075 A | 6/1985 | Obenschain et al. | 359/569 |
| 4,619,508 A | 10/1986 | Shibuya et al. | 353/122 |
| 4,707,081 A * | 11/1987 | Mir | 359/254 |
| 5,153,773 A | 10/1992 | Muraki et al. | 359/619 |
| 5,164,848 A | 11/1992 | Firth et al. | 359/13 |
| 5,189,549 A * | 2/1993 | Leventis et al. | 359/271 |
| 5,224,200 A | 6/1993 | Rasmussen et al. | 385/146 |
| 5,272,473 A | 12/1993 | Thompson et al. | 345/7 |
| 5,313,479 A | 5/1994 | Florence | 372/26 |
| 5,363,170 A | 11/1994 | Muraki | 355/67 |
| 5,534,950 A | 7/1996 | Hargis et al. | 348/758 |
| 5,703,710 A * | 12/1997 | Brinkman et al. | 359/283 |
| 5,740,190 A | 4/1998 | Moulton | 372/23 |
| 5,828,424 A | 10/1998 | Wallenstein | 348/760 |
| 6,005,722 A | 12/1999 | Butterworth et al. | 359/712 |
| 6,011,643 A | 1/2000 | Wunderlich et al. | 359/279 |
| 6,081,381 A | 6/2000 | Shalapenok et al. | 359/619 |
| 6,092,900 A | 7/2000 | Diedrich et al. | 353/122 |
| 6,122,023 A | 9/2000 | Chen et al. | 349/86 |
| 6,154,259 A | 11/2000 | Hargis et al. | 348/756 |
| 6,222,667 B1 * | 4/2001 | Gobeli | 359/323 |
| 6,233,025 B1 | 5/2001 | Wallenstein | 348/750 |
| 6,233,089 B1 | 5/2001 | Nebel | 359/330 |
| 6,411,420 B1 * | 6/2002 | Yamada et al. | 359/247 |

FOREIGN PATENT DOCUMENTS

| | | |
|---|---|---|
| JP | 57111512 | 7/1982 |
| JP | 61279822 | 12/1986 |
| WO | WO 00/65401 | 11/2000 |

* cited by examiner

Primary Examiner—Hung Xuan Dang
Assistant Examiner—Joseph P Martinez
(74) Attorney, Agent, or Firm—Stephen H. Shaw (57) ABSTRACT

A method of reducing the appearance of speckle resulting from a coherent light beam, includes the steps of: providing an electro-optic device having, an electro-optic substrate, an electrode array arranged on the surface of the electro-optic substrate, at least one electrode located on the opposite surface of the electro-optic substrate, and means for applying voltage to the electrodes to generate a variation in a refractive index profile within the substrate; and directing the light beam through the electro-optic device while applying voltage to the device, whereby the temporal and spatial phase of a light beam passing through the substrate is altered, thereby reducing the appearance of speckle.

36 Claims, 12 Drawing Sheets

ELECTRO-OPTIC DESPECKLING MODULATOR AND METHOD OF USE

FIELD OF THE INVENTION

The invention relates to the reduction of speckle in optical systems. Specifically, this invention proposes an electro-optic modulator that alters phase wavefronts of an incident beam thereby reducing spatial or temporal coherence in a light beam.

BACKGROUND OF THE INVENTION

Projection display systems for the display of video images are well-known in the prior art. Typically, these systems have taken the basic form of a white light source, most notably a xenon arc lamp, illuminating one or more light valves or spatial light modulators with appropriate color filtering to form the desired image, the image being projected onto a viewing screen.

Lasers have been known to be an attractive alternative light source to arc lamps for projection displays. One potential advantage is a wider color gamut featuring very saturated colors. Laser illumination offers the potential for simple, low-cost efficient optical systems, providing improved efficiency and higher contrast when paired with some spatial light modulators. One disadvantage of lasers for projection display has been the lack of a cost-effective laser source with sufficient power at visible wavelengths.

Laser sources appropriate for display systems are becoming available and are known in the prior art. Two examples are produced by JenOptik and Lumera Laser, GmbH, and are mode-locked, diode-pumped, solid-state lasers, each with a nonlinear-optical system featuring an optical parametric oscillator (OPO) to simultaneously generate red, green, and blue light. This system has been disclosed by Wallenstein in U.S. Pat. No. 5,828,424, issued Oct. 27, 1998 and U.S. Pat. No. 6,233,025 issued May 15, 2001; and by Nebel in U.S. Pat. No. 6,233,089, issued May 15, 2001. Another example disclosed by Moulton in U.S. Pat. No. 5,740,190, issued Apr. 14, 1998 is developed by Q-Peak and is a Q-switched DPSS laser with an OPO system to simultaneously generate red, green, and blue light.

Two-dimensional spatial light modulators can be used in laser display systems. Examples include reflective liquid crystal modulators such as the liquid-crystal-on-silicon (LCOS) modulators available from JVC, Three-Five, Aurora, and Philips, and micromirror arrays such as the Digital Light Processing (DLP) chips available from Texas Instruments. Advantages of two-dimensional modulators over one-dimensional array modulators and raster-scanned systems are the lack of a need for vertical scanning systems, absence of streak artifacts due to non-uniformities in the modulator array, and immunity to laser noise at frequencies much greater than the frame refresh rate ($\geq$120 Hz). A further advantage of two-dimensional spatial light modulators is the wide tolerance for reduction of the spatial coherence of the illuminating beam.

One major disadvantage of the use of lasers in projection displays is the speckle effect. Speckle arises due to the high degree of coherence (both spatial and temporal) inherent in most laser sources. Speckle produces a noise component in the image, as a granular structure, which both degrades the actual sharpness of the image and annoys the viewers. As such, the speckle problem, as well as the historical lack of appropriate laser sources, has inhibited the development of marketable laser-based display systems.

The prior art is rich in ways of attempting to reduce speckle. One common approach is to reduce the temporal coherence of a laser beam by broadening the linewidth. Ultrafast lasers may help, but are not believed to reduce speckle to the required degree. Other approaches to reducing the temporal coherence are to split the illuminating wavefront into beamlets and delay them relative to each other by longer than the coherence time of the laser. Variations on this basic idea have been disclosed in U.S. Pat. No. 3,633,999 issued Jan. 11, 1972 to Buckles; U.S. Pat. No. 4,511,220 issued Apr. 16, 1985 to Scully; U.S. Pat. No. 4,521,075 issued Jun. 4, 1985 to Obenschain et al.; U.S. Pat. No. 4,619,508 issued Oct. 28, 1986 to Shibuya et al.; U.S. Pat. No. 5,153,773 issued Oct. 6, 1992 to Muraki et al.; U.S. Pat. No. 5,224,200 issued Jun. 29, 1993 to Rasmussen et al.; U.S. Pat. No. 5,363,170 issued Nov. 8, 1994 to Muraki; and U.S. Pat. No. 6,011,643 issued Jan. 4, 2000 to Wunderlich et al. A disadvantage of this approach is the complication it introduces to the optical system to implement a sufficient number of different beam paths.

Dynamically varying the speckle pattern is another way of reducing the visibility of the speckle pattern. One way of doing this is to vibrate or otherwise alter the viewing screen. Vibrating a screen or multiple screens have been disclosed in U.S. Pat. No. 4,033,683 issued Jul. 5, 1977 to Tancredi; U.S. Pat. No. 4,143,943 issued Mar. 13, 1979 to Rawson; and U.S. Pat. No. 5,272,473 issued Dec. 21, 1993 to Thompson et al. Active screens with dynamically varying diffusion properties have been disclosed in U.S. Pat. No. 3,650,608 issued Mar. 21, 1972 to Baker; U.S. Pat. No. 6,092,900 issued Jul. 25, 2000 to Diedrich et al.; and U.S. Pat. No. 6,122,023 issued Sep. 19, 2000 to Chen et al. A disadvantage to this approach is the expense of the active screens and the need to engineer a special screen for each theater. A cost-effective despeckling solution implemented within the projector is desired.

Within the projector system, a number of approaches have been attempted to dynamically vary the speckle pattern. One concept employs coupling the laser light into a multimode optical fiber and vibrating the fiber to cause mode-scrambling. This approach is found in U.S. Pat. No. 3,588,217 issued Jun. 28, 1971 to Mathisen, and U.S. Pat. No. 4,011,403 issued Mar. 8, 1977 to Epstein et al. Disadvantages associated with this approach are insertion losses due to coupling into the fiber, and loss of polarization, which is required with some light valves.

Another despeckling concept utilizes vibration or motion of the optical components within the projector to vibrate the image, such as rotating lenslet arrays disclosed in U.S. Pat. No. 3,851,515 issued Dec. 3, 1974 to Hautau and U.S. Pat. No. 6,081,381 issued Jun. 27, 2000 to Shalapenok et al., and vibrating an entire image as shown in published application WO 00/65401 published Nov. 2, 2000. The former has the disadvantage of only allowing circular illumination patterns, while the latter has a deleterious effect on image quality.

Finally, another family of despeckling solutions features a diffusing element that is moved or vibrated within the projector system. Typically, this is done at an intermediate image plane, as disclosed in U.S. Pat. No. 4,035,068 issued Jul. 12, 1977 to Rawson; U.S. Pat. No. 4,201,473 issued May 6, 1980 to Domenicali et al.; U.S. Pat. No. 4,256,363 issued Mar. 17, 1981 to Briones; U.S. Pat. No. 5,164,848 issued Nov. 17, 1992 to Firth et al.; U.S. Pat. No. 5,534,950 issued Jul. 9, 1996 to Hargis et al.; and U.S. Pat. No. 6,154,259 issued Nov. 28, 2000 to Hargis et al. A disadvantage of this approach is that the diffusion must occur precisely at the image plane or a softening of the image will occur. Also, the projection lens is complicated by the requirement to provide an intermediate image plane.

It has been proposed to dynamically vary the speckle pattern by dynamically diffusing the laser beam in the illumination path of the device. This approach has been disclosed by vanLigten in U.S. Pat. No. 3,490,827, issued Jan. 20, 1970, in which a diffuser is rotated in the focus of a beam expander. Florence discloses, in U.S. Pat. No. 5,313,479, issued May 17, 1994, illuminating a light valve through a rotating diffuser. These approaches have the disadvantage of not being adaptable to efficient illumination of a rectangular spatial light modulator. Butterworth in Patent U.S. Pat. No. 6,005,722, issued Dec. 21, 1999, discloses a system in which a variable-thickness plate is rotated in the illumination of a light pipe homogenizer. Light pipe homogenizers, though, require either a large numerical aperture or a substantial length to achieve optimum uniformity.

Another disadvantage of using a laser as a light source in an image projector is the susceptibility of interference or the occurrence of diffraction artifacts in the light valve. This is especially true of liquid crystal modulators, wherein the thin-film structure can result in fringes in the image due to non-uniformities in the film layers. Diffraction artifacts arise from illuminating a grid electrode pattern in the light modulator with a highly coherent beam of light.

There is a need therefore for an optical device that alters the wavefront phase of a light beam or reduces coherence, such that when the device is incorporated into a display system, speckle and other coherence artifacts are reduced.

SUMMARY OF THE INVENTION

The need is met according to the present invention by providing a method of reducing the appearance of speckle resulting from a coherent light beam, including the steps of: providing an electro-optic device having an electro-optic substrate, an electrode array arranged on the surface of the electro-optic substrate, at least one electrode located on the opposite surface of the electro-optic substrate, and means for applying voltage to the electrodes to generate a variation in a refractive index profile within the substrate; and directing the light beam through the electro-optic device while applying voltage to the device, whereby the coherence of the light beam is reduced, thereby reducing the appearance of speckle through phase front modulation.

DETAILED DESCRIPTION OF THE INVENTION

Figure 4A:
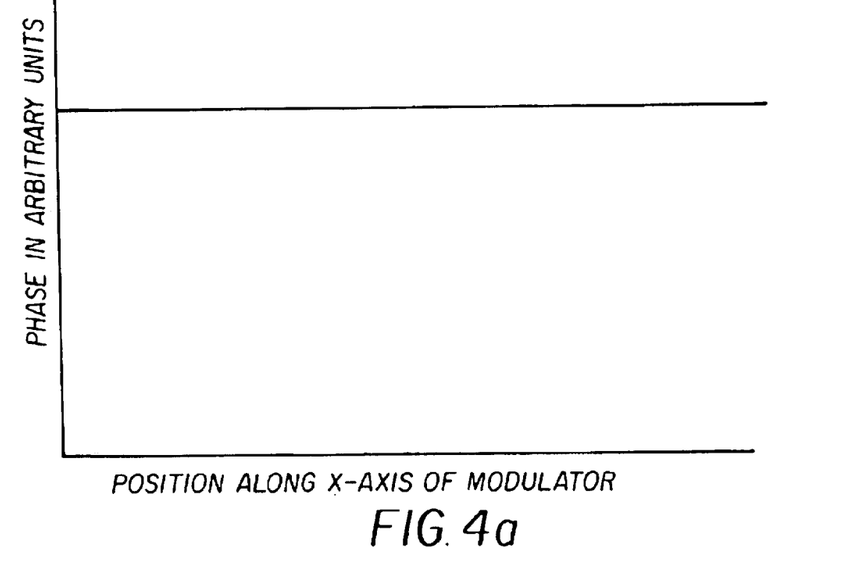
FIG. 4a is representation of the phase profile of the output of an optical system exhibiting visible speckle.
Figure 4B:
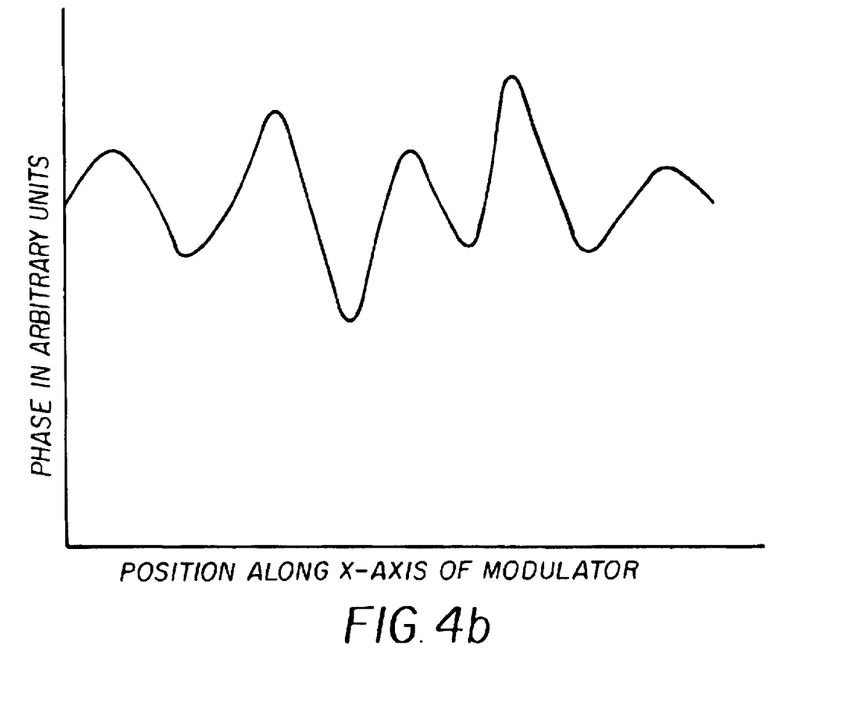
FIG. 4b is a representation of the phase profile of the output of an optical system that has reduced visibility speckle.
Figure 4C:
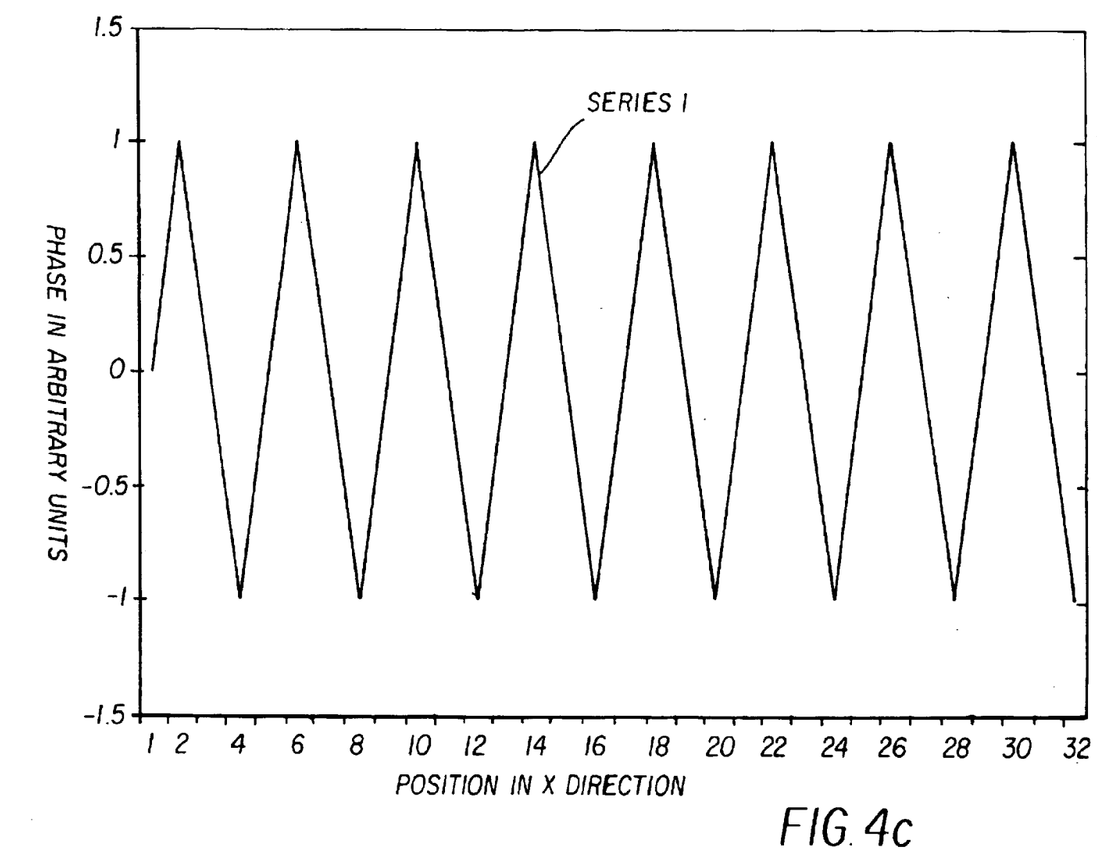
FIG. 4c is a representation of a periodic phase profile of an optical system that has reduced visibility speckle.

A primary purpose of the present invention is to provide means to despeckle the output of a pixilated optical system. Speckle in such a system can be reduced when adjacent pixels or groups of pixels are not perfectly in phase with one another either spatially or temporally. The phase profile across a group of pixels exhibiting speckle is shown in FIG. 4a. The purpose of the present invention is to alter the phase profile shown in FIG. 4a such that it more closely resembles the profile shown in FIG. 4b. FIG. 4b shows a more random phase profile in which at any given instant in time adjacent regions along the x-direction see different phase profiles. Also effective, would be a geometry that provides a periodic or quasi-periodic profile as shown in FIG. 4c. While periodic or quasi-periodic phase profiles reduce speckle, other effects due to the periodic nature of the phase may occur. For that reason, the preferred mode of operation is one creating a phase profile as seen in FIG. 4b. It should be noted that there need not be a one to one correspondence between the pixels of the optical system and the modulator sites of the electro-optic device. In fact the optical system need not be pixilated at all, and could use an analog medium such as film for the image modulation.

The device of the present invention provides enough variation of phase along the profile of the light beam that the viewer or viewing system receives a reduced speckle image when the modulator is used in conjunction with an appropriate optical system. By addressing the modulator sites independently, each site can acquire phase delays with respect to the neighboring sites. Each site (or group of sites) sees a different applied voltage or voltage duration than the adjacent site, thus producing a phase delay (a change in optical path length) corresponding to as much as several waves of propagation. This variation to the phase profile significantly reduces the appearance of speckle. By picking a voltage distribution that spatially provides a perturbed phase front and varying it in time, there is both spatial and temporal phase variation.

According to the present invention a device is incorporated into an optical system to reduce speckle. The device reduces speckle through the reduction of coherence in a light beam spatially and/or temporally. The inclusion of the device in the optical system serves to effectively scramble the phase profile of an exiting beam by varying the refractive index profile in the medium through which light travels.

Figure 1:
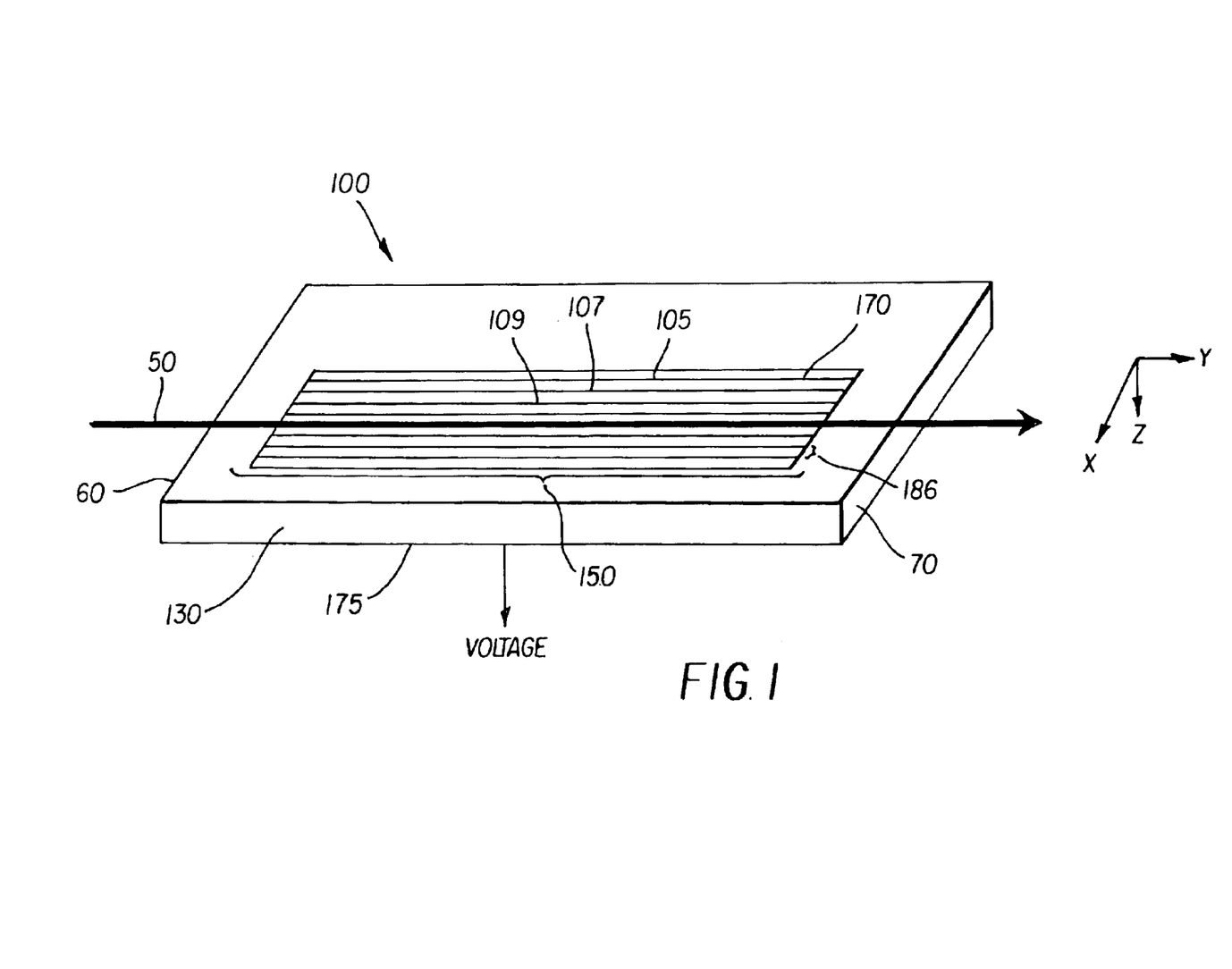
FIG. 1 is a perspective view of the first embodiment of the time/phase delay modulator of the present invention.

Referring to FIG. 1, there is shown a first embodiment of the spatial light modulator array device 100 of the present invention. The spatial light modulator array is a patterned device including a collection of addressable modulator sites that produce controlled time or phase delays with respect to adjacent pixels in accordance with signals, or data provided to individual modulator sites.

In a preferred embodiment, the spatial light modulator comprises a bulk electro-optic substrate 130 with individual modulator sites 105. Each modulator site 105 has a delay region 150 through which a beam of light 50 encounters a time or phase delay in relation to the electric field applied between electrode 170 and electrode 175. Beam of light 50 enters bulk electro-optic substrate 130 through an input facet 60, after which it traverses the modulator, and exits through output facet 70.

The choices of electro optic materials from which to build the present invention are numerous and include Lithium niobate, lithium tantalate and PLZT. For the sake of simplicity further discussion of the parameters for the present invention will center around the use of lithium tantalate illuminated at 633 nm, but it should be understood the geometry is applicable to a variety of materials and illumination wavelengths. If a different material is employed, care must be taken to ensure the correct axes are employed. For example, use of PLZT in such a device design can produce orders of magnitude greater of phase delay along a modulator site due to the larger electro-optic coefficient. However, the crystal must be oriented in a manner such that the applied electric field interacts with the optical field through the appropriate axes of the crystal.

In the case of lithium tantalate, the geometry represented here is shown as y-cut, meaning that light propagates along the y-direction and electric field is applied along the z-direction. For best results, the light traveling through the modulator is polarized along the x-direction (transverse direction). For the purposes of this discussion, light propagation direction will be referred to as the c-axis so that there is no confusion between the crystal axis and the propagation axis. Other cuts and geometries of the crystal maybe employed, but in this preferred embodiment, y-cut is optimal.

Figure 2:
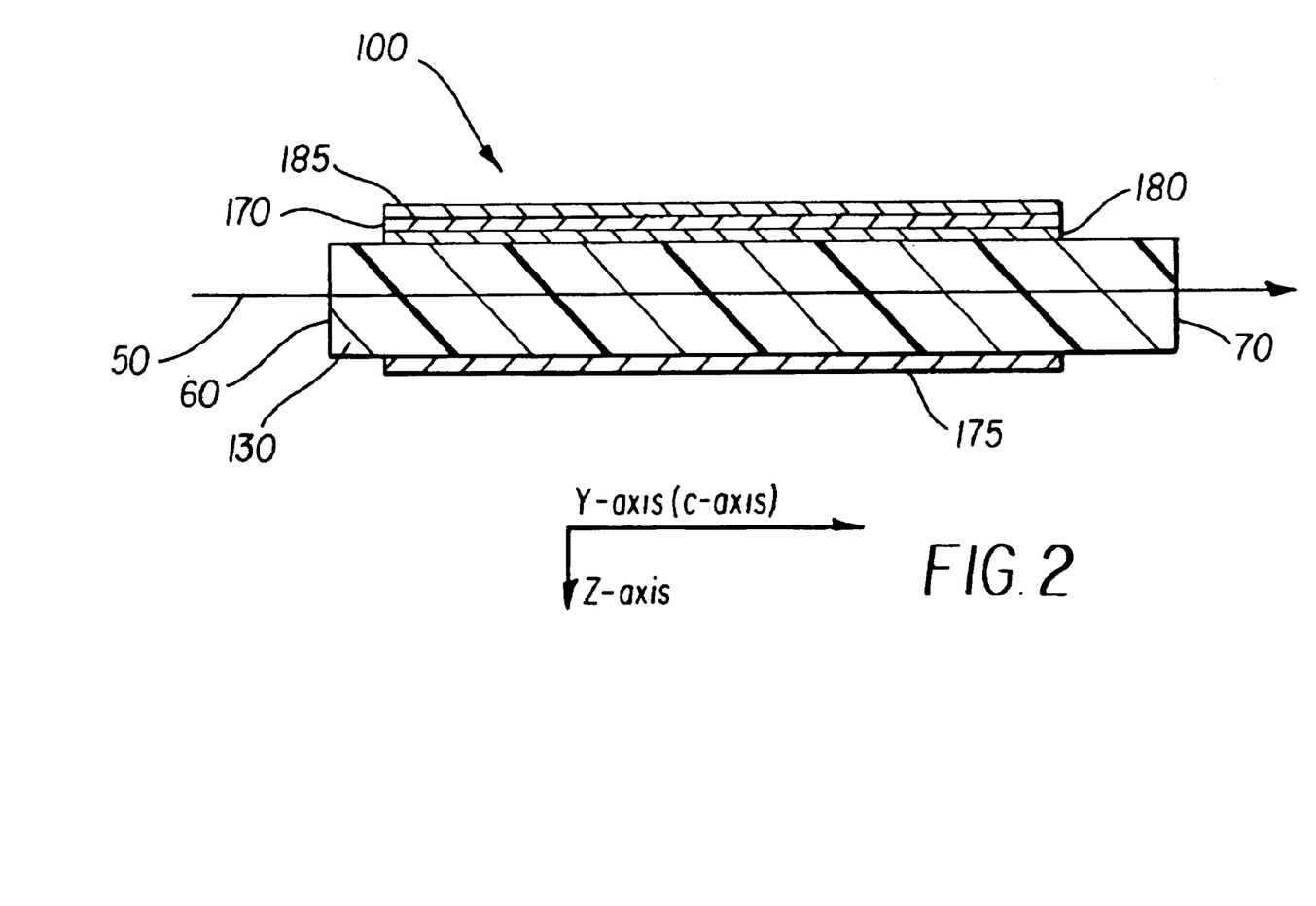
FIG. 2 is a cross-sectional view of the first embodiment of the time/phase delay modulator of the present invention.

FIG. 2 shows a cross section of the spatial light modulator 100 with a beam 50 propagating along the y-axis of the modulator. It may be advantageous for the input and output facets of the modulator to be antireflection coated. Furthermore, since the device effectively perturbs phase fronts, it should be recognized that input light to the modulator can come from a variety of sources simultaneously. The device 100 may operate on several wavelengths and angular extents simultaneously.

A single modulator site can be defined as the region between electrodes 170 and 175. A segment of light 186, as defined along the x-direction propagates along the crystal between electrodes 170 and 175. Light passing through that region acquires a phase change $\Delta\phi$ defined as follows:

$$\Delta\phi = (\pi/\lambda) n^3 r_{33} l V/d \tag{1}$$

Figure 3:
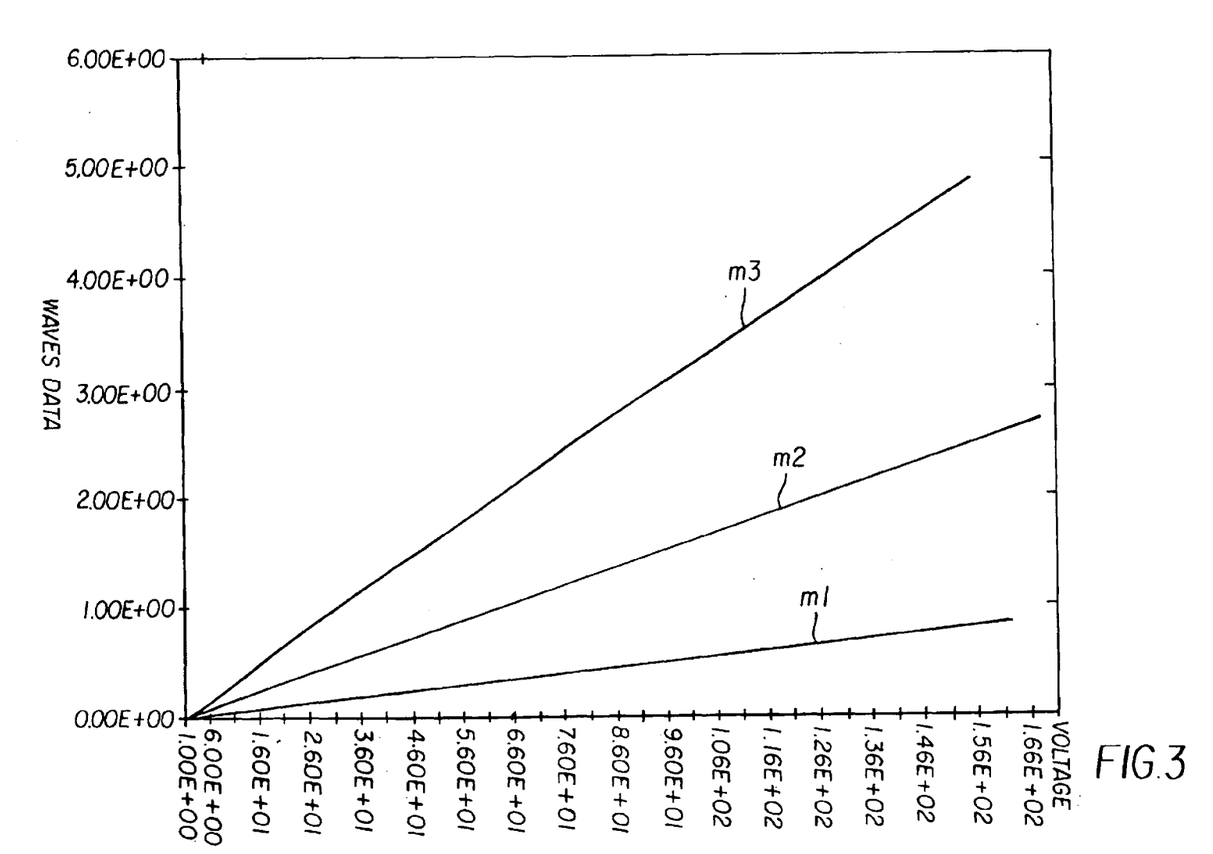
FIG. 3 is a chart of expected delay as a function of applied voltage for several different propagation lengths for the modulator of the present invention.

As is seen in Eq. 1, the phase change $\Delta\phi$ is a function of applied voltage V, length of propagation l, distance between electrodes d, wavelength of light $\lambda$, refractive index n, and the r33 coefficient for y-cut Lithium tantalate. Given reasonable fabrication parameters such as propagation lengths from 5–50 mm, thickness of 500 $\mu$m, and illumination wavelength in the red spectrum, phase delays of as much as several wavelengths can be generated for operating voltages between 0V and 160V. These results are shown in the chart of FIG. 3, in which curves m1, m2, and m3 correspond to propagation lengths, l, of 10, 20, and 30 mm. Understandably, all the input parameters can be altered to render more or less delay along a given channel or modulator site. All delays have been represented by distance or number of waves. It is equivalent to discuss delay as a time delay given by the distance of delay divided by the propagation velocity of the light in the medium.

Referring back to FIG. 1, a plurality of modulator sites 105, 107, 109 is defined by several regions such as the one shown in cross section in FIG. 2. A top electrode 170 and bottom electrode 175 defines each modulator site. It may be useful on fabrication to have a common unpatterned electrode on one side of the device as opposed to patterning both the top and bottom of the device. This allows modulation through differential voltage applied to the electrodes on one side of the device. Each modulator site can be operated independently through means of different applied voltages, different address times, or combinations of both. The present invention can be used as either an analog voltage driven modulator, a pulse width modulated device, or a combination of both. The width of any given electrode along the x-direction can be anywhere from sub-wavelength in width to literally millimeters in width.

It may be of use to periodically switch the polarities of the top and bottom electrodes, or to introduce a blanking pulse. Such operation allows dissipation of space charge in the substrate 130. Furthermore, because the operational voltages can be quite high and because the optical field may not be well contained, the electrodes may be patterned with material such as SiO2 under the electrode to act as a buffer layer 180 (see FIG. 2). Also, an overcoat 185 of acrylic or other insulating material may be applied to prevent arcing in air.

Figure 5A:
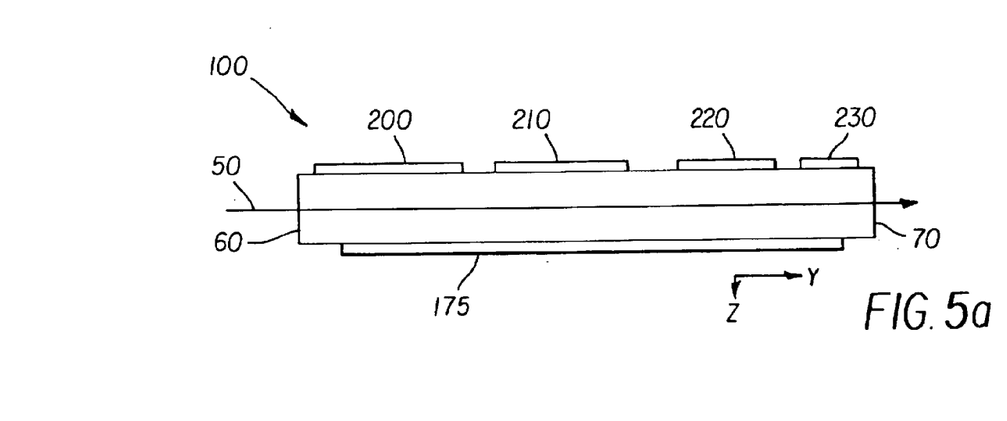
FIG. 5a is a side view of a second embodiment of a phase/time delay modulator of the present invention.

In a second embodiment shown in cross section in FIG. 5a, each modulator site consists of a series of electrodes 200–230 spaced along the y-axis of the crystal. A modulator site can be activated using all or a subset of the electrodes, for instance electrodes 200, 210, and 220, thus providing variable delay even with a single drive voltage. Each electrode (which may be of distinct length) can be driven such that the applied voltage in conjunction with the electrode length can give different known fractions of wavelength delay. For instance, the first electrode may produce a 1/8 wavelength delay, the second 1/16, the third 1/32, and so forth. The applied voltage can be adjusted such that the same length of electrode renders the same number of wavelengths delay for different wavelengths of light. Additionally the electrodes can be modulated in time individually within each modulator site thus further randomizing the phase.

Figure 5B:
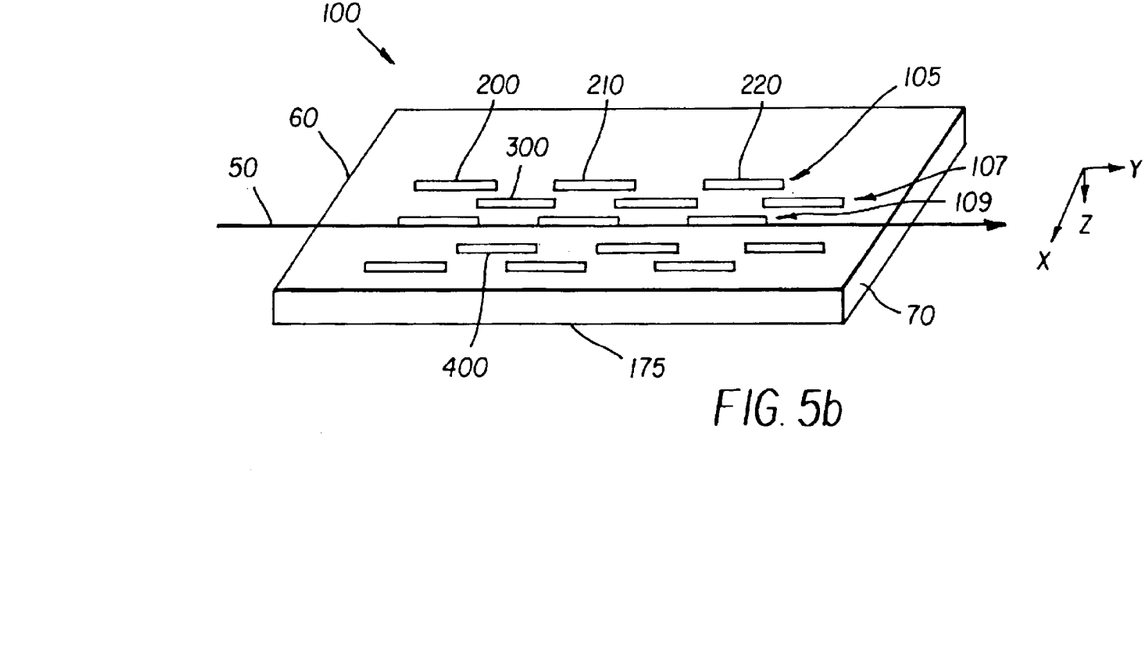
FIG. 5b is a perspective view of a second embodiment of a phase/time delay modulator of the present invention.

While adding to the complexity, it may provide additional control to have different electrode geometries between adjacent pixels as shown in FIG. 5b. By spacing electrodes 200, 210, 220 within a modulator site and staggering electrodes 200, 300, 400 between adjacent modulator sites, the device is less prone to electrical cross talk effects. Similar results can be achieved by allowing space between electrodes both between adjacent modulator sites 105, 107, 109 as well as within a single site 105.

Figure 6A:
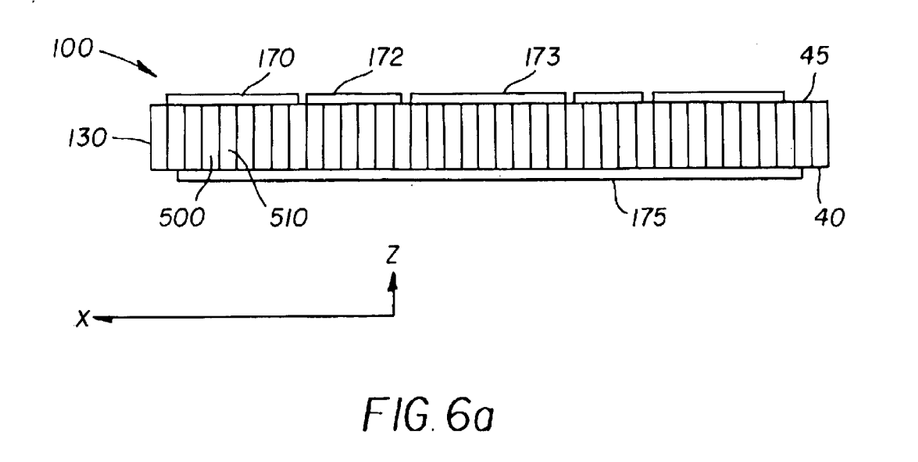
FIG. 6a is a side view of a third embodiment of a phase/time delay modulator of the present invention having periodic poling.
Figure 6B:
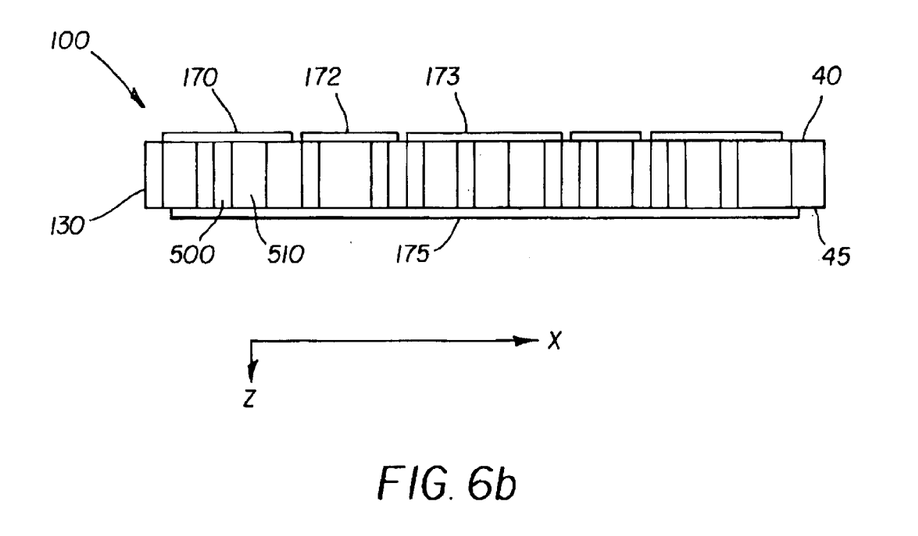
FIG. 6b is a side view of a third embodiment of a phase/time delay modulator of the present invention having periodic poling.

Referring to FIGS. 6a and b, in an alternate embodiment the modulator sites are not symmetric along the x-direction. Because the primary purpose of this modulator is to perturb the uniform phase, introducing asymmetry to the lateral beam profile can further serve to reduce the appearance of speckle. The asymmetry is introduced by patterning electrodes 170, 172, 173 to have various widths on at least one surface 40 or 45.

It should be noted that the particular shape of an electrode in the geometry of the device is of little consequence. Since the object of the device is to perturb the phase wavefront of the beam, any electrode shape or geometry that induces such a perturbation is acceptable.

Also shown in FIG. 6a is the use of poling of the bulk material 130 in the x direction. Such poling can introduce further perturbations in the lateral phase profile of the beam. Poling produces adjacent regions 500, 510, that when addressed with the same voltage produce changes in refractive index that are opposite in direction. One region 500 would add Δn, the next 510 would subtract it. Use of poling (periodic as in FIG. 6a or aperiodic as in 6b), allows a single electrode to address a region of material with a single address voltage. The single address voltage produces multiple phase regions. For cases where the electrode width is greater than the width required to reduce speckling within a defined system, the poled regions can provide sufficient substructure. It is somewhat preferable to employ an aperiodic structure so as not to enhance grating or periodic effects.

Figure 7A:
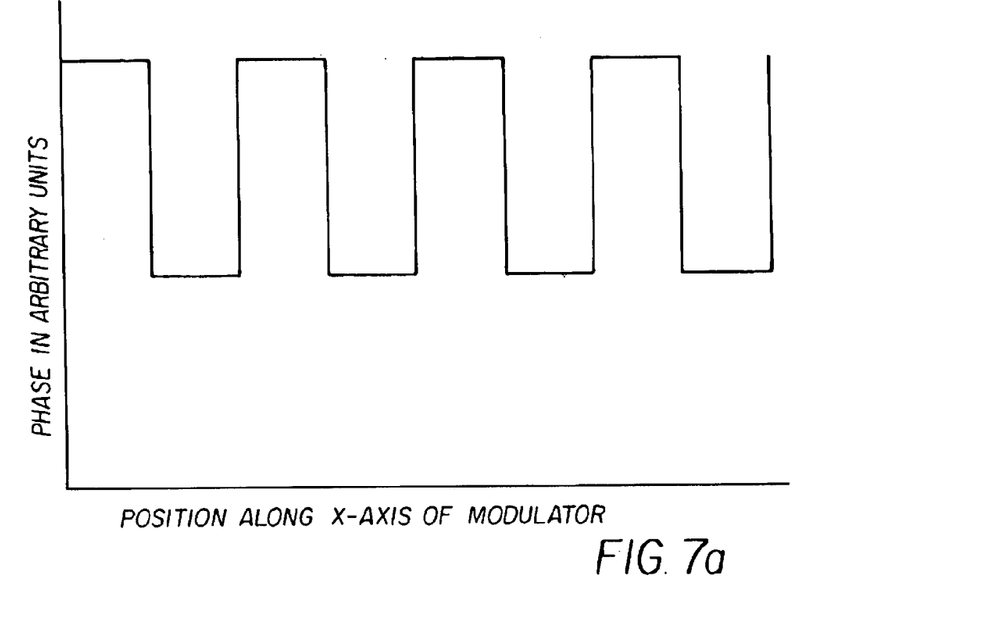
FIG. 7a is representation of the phase profile of the output a device with a well contained electric field.
Figure 7B:
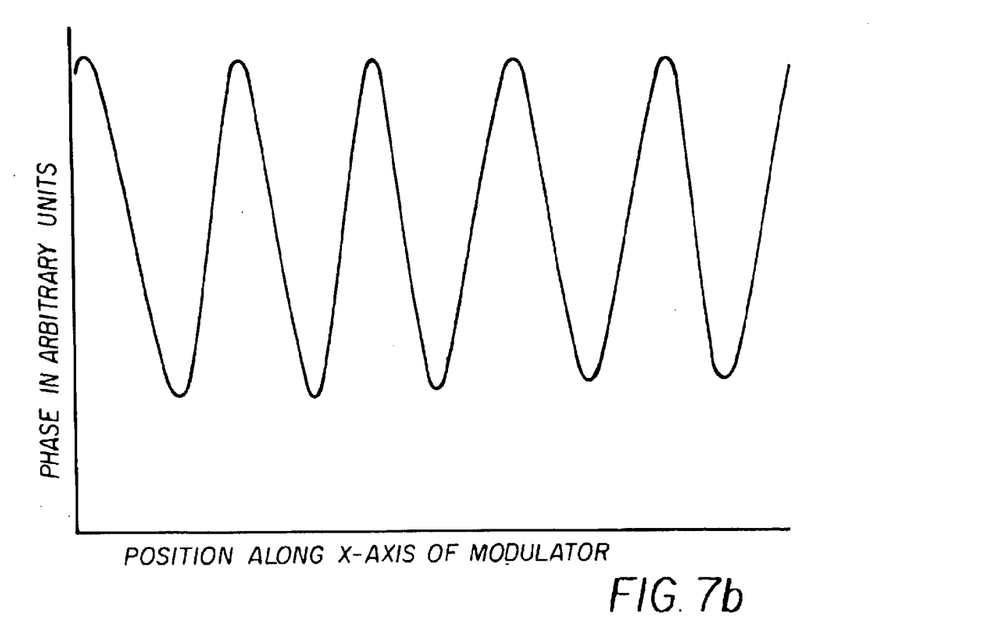
FIG. 7b is representation of the phase profile of the output a device exhibiting cross-talk.

An interesting feature of the present invention is the lack of strict attention paid to cross talk. When placing electrodes in proximity to each other, one expects adjacent regions to experience electrical cross talk. Since the effect of this invention does not rely on pixellating the device, cross talk between electrodes is not a major issue. The device is effectively a phase scrambler, and introduction of cross-talk or such "noise" only accentuates the operation. In fact, using cross talk in the design can provide means to smooth and further control the phase profile of the device. A device exhibiting no cross talk may provide a phase profile as is shown in FIG. 7a. Cross talk between electrodes can produce a profile as is shown in FIG. 7b. In FIG. 7b, phase control, or control of the refractive index profile, is controllable at every point along the x-axis. In this manner the current invention is quite unique from existing modulator art. The design presented here is quite distinct in operation as well as design.

In the event that the user wishes to contain cross talk effects, the electrodes will need to have sufficient gaps between them to prevent cross talk. For instance, if the device is to be operated in a pulse width modulated mode at extremely high frequency, the electric field may appear uniform across the device unless the electrodes have sufficient space between them. Additionally poling the material of the substrate as shown in FIGS. 6a and b will alleviate cross-talk effects.

Figure 8A:
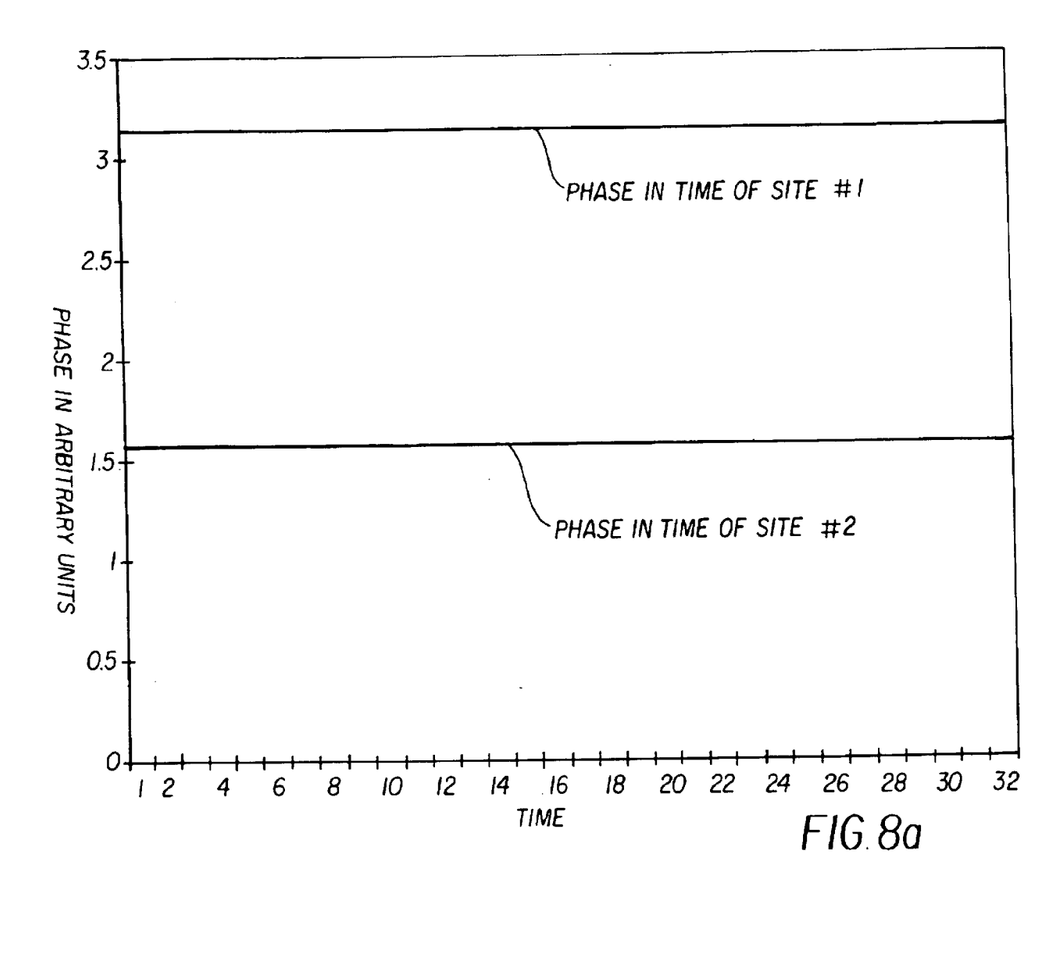
FIG. 8a is a chart of the relative phase delay between adjacent modulator sites in a device that produces only lateral phase perturbations.
Figure 8B:
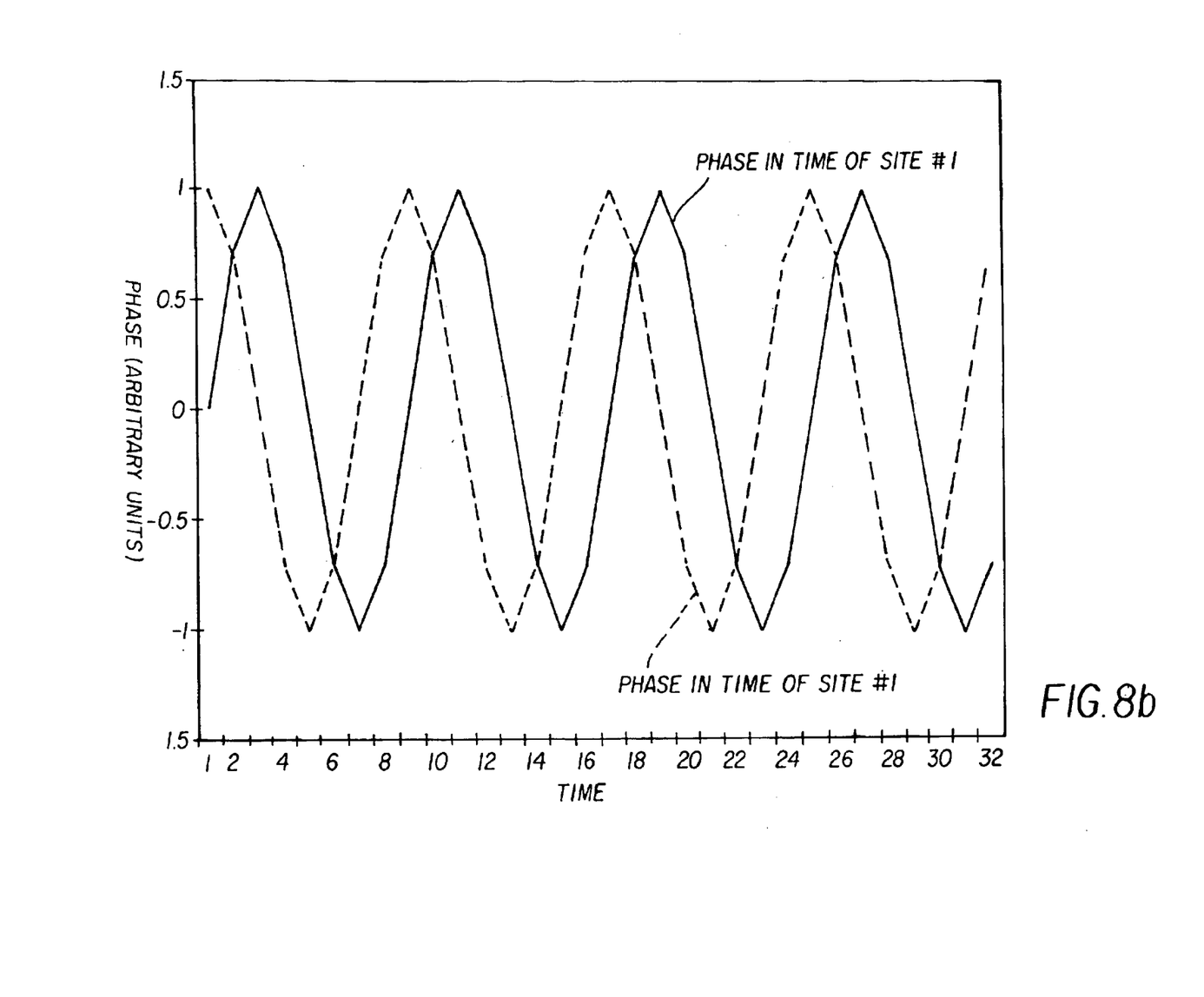
FIG. 8b is a chart of the relative phase delay between adjacent modulator sites in a device with out-of-phase time varying field profiles.
Figure 8C:
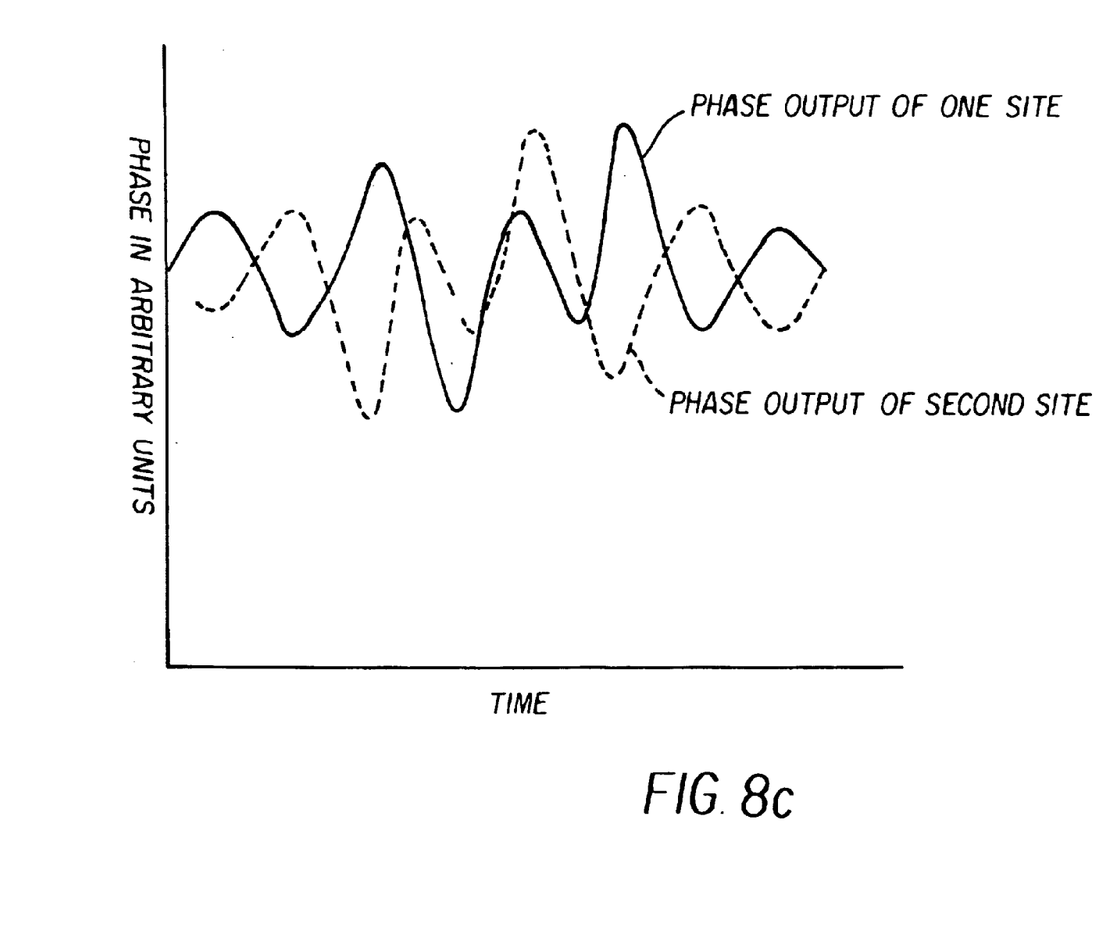
FIG. 8c is a chart of the relative phase delay between adjacent modulator sites in a device with both lateral and time varying phase perturbations.

Because the appearance of speckle can be reduced both by spatial variations to the lateral phase profile or by time variations between adjacent regions, the operation of the device can be modified to accommodate both. In the first case, a lateral electric field distribution is established as a function of address to the electrodes as is shown in FIG. 8a. This distribution, in turn, defines a lateral phase perturbation. In the case of temporal variation, the same field profile may be employed at different sites. However, in time, the relative fields are varying such that adjacent regions are out of phase with each other. A graph of such behavior is shown in FIG. 8b. Ideally, a combination of both methods of operation provides the best result. Such operation is shown in FIG. 8c.

Figure 9A:
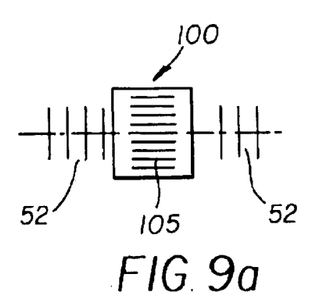
FIGS. 9a and 9b illustrate the effect of a modulator of the present invention in terms of an unaffected wavefront and an aberrated wavefront respectively, in the case of incident collimated light.
Figure 9B:
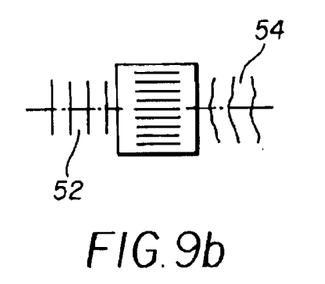
Figure 9C:
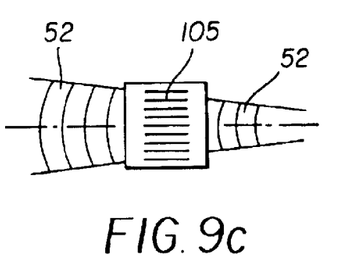
FIGS. 9c and 9d illustrate the effect of a modulator of the present invention in terms of an unaffected wavefront and an aberrated wavefront respectively, in the case of incident convergent light.
Figure 9D:
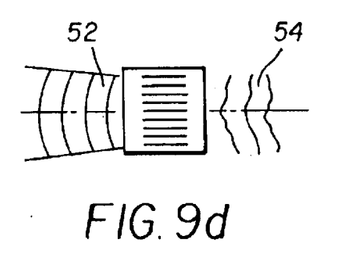

Fundamentally, spatial light modulator 100 of the present invention functions to perturb or scramble the phase fronts of the incident light. Conceptually, this effect is considered in FIGS. 9a and 9b for the case of collimated light, with planar parallel wave fronts 52 directed at normal incidence onto the modulator. In the case of FIG. 9a, modulator 100 is off (0V drive voltage, and the wave fronts emerge unaltered. In the case of FIG. 9b, the modulator sites 105 are activated, and aberrated wave fronts 54 emerge from the device. FIGS. 9c and 9d illustrate the equivalent cases, where the modulator 100 is located in convergent space within an optical system. It should be understood that these wave front distortions are exaggerated in extent and only representative of the general concepts. They are not necessarily depictions of wave fronts located 1 λ apart.

As stated previously, depending on the detailed structure of the modulator sites 105, the electrode patterning which comprises these modulator sites, the manner of drive voltage control, and the use of a poled or unpoled substructure, a variable or constant time or phase delay can be provided over various spatial extents, with respect to the incident light. For example, the incident light can be regarded as a series of beams of finite extent (several mm), whose phase relationships are modulated relative to each other. Alternately, the incident light can be regarded as a single beam with a spatial coherence across some finite extent, of anywhere from several waves width to several mm width. Within this beam, phase delays (changes in optical path length) can be provided on a localized and random basis, on a width scale from sub-wavelength to multi-wavelength to multi-mm, depending on the device structure. As these random time or phase delays are applied across the spatial extent of the incident light beam, spatial phase variations are created much as depicted in FIG. 9. As a result, the incident light beams are effectively aberrated to a greater or lesser extent, depending on the device structure and randomized drive voltages.

While the spatial light modulator of the present invention provides the ability to distort wavefronts by providing spatial and temporal phase perturbations, the ability of the device to affect the appearance of speckle depends on the design of the system in which it is used. For example, in a white light projection system, the coherence length and width of the light may only be several wavelengths in extent. Thus, a modulator which provides several waves of delay (such as shown in Lithium tantalate) can provide sufficient phase delay (up to several waves) to directly alter the coherence relationships on an ongoing basis. Lasers on the other hand, have coherence lengths ranging from fractions of a mm (0.1–5.0 mm for Red/Green/Blue optical parametric oscillator type lasers), to meters in extent. In the case where the device provides a few waves of delay along a modulator site, the temporal and spatial phase variations will cause time variant wave front distortions or aberrations, but will not directly alter the spatial or temporal coherence in an appreciable way. However, the time and space variable phase can be used to vary or average the speckle within the projected image, thereby reducing the perceptibility of the speckle if the variations are more rapid than the response time of the human eye. In the case where the device provides delay of the same magnitude as the coherence length of the source, the spatial and temporal coherence are simultaneously altered, thus reducing speckle.

While this device has been presented as a linear model, stacking modulators can produce a 2-dimensional effect. In addition, it is possible to employ a series of devices placed optically in series one after another, or at various points in an optical system. It should be understood that this device can operate within both the infrared and visible spectral ranges, although with variable effectiveness, depending on the material properties of the bulk electro-optic crystalline material.

The invention has been described in detail with particular reference to certain preferred embodiments thereof, but it will be understood that variations and modifications can be effected within the spirit and scope of the invention.

PARTS LIST 40 top surface
45 bottom surface
50 light
52 wave front
54 aberrated wave front
60 input facet
70 output facet
100 spatial light modulator
105 modulator site
107 modulator site
109 modulator site
130 bulk material or substrate
150 delay region
170 top electrode
172 electrode
173 electrode
175 bottom electrode
180 buffer layer
185 overcoat
186 segment of light
200 electrode
210 electrode
220 electrode
230 electrode
300 electrode
400 electrode
500 first poled region
510 second poled region

What is claimed is:

1. A method of distorting the temporal and spatial phase of a light beam, comprising the steps of:
   a) providing an electro-optic device having,
      i) an electro-optic substrate,
      ii) an electrode array arranged on the surface of the electro-optic substrate,
      iii) at least one electrode located on the opposite surface of the electro-optic substrate, and
      iv) means for independently applying voltages having different voltages, different address times, or combinations thereof to the electrodes in the array to generate a variation in a refractive index profile within the substrate; and
   b) directing the light beam through the electro-optic device while applying voltage to the device, whereby the temporal and spatial phase are altered, thereby reducing the appearance of speckle.

2. The method claimed in claim 1 wherein the electrode array is arranged on the surface of the electro-optic substrate such that the electrodes in the array are spaced closely enough to provide sufficient cross-talk in the presence of an electric field to induce a phase shift along any point.

3. The method claimed in claim 1 wherein the electrode array is an aperiodic array thereby reducing the periodicity of the phase profile in the electro-optic substrate.

4. The method claimed in claim 1 wherein the electro-optic substrate is periodically poled.

5. The method claimed in claim 1 wherein the electro-optic substrate is aperiodically poled.

6. The method claimed in claim 1 wherein the electro-optic device further comprises a buffer layer between the substrate and the electrode array.

7. The method claimed in claim 1 wherein the electro-optic device further comprises an insulating overcoat over the electrode array.

8. The method claimed in claim 1 wherein the voltage is a time varying voltage.

9. The method claimed in claim 1 further comprising the step of periodically switching the polarity between first surface and the opposite surface.

10. The method claimed in claim 1 wherein the voltage is a time varying analog voltage.

11. The method claimed in claim 1 wherein the voltage is a pulse width modulated voltage.

12. The method claimed in claim 1, wherein there are a plurality of electrodes on the opposite surface and the means for independently applying voltages includes means for independently applying different voltages to the electrodes on the opposite surface.

13. A device for use with a light beam to reduce the appearance of speckle, comprising:
   a) an electro-optic substrate;
   b) an electrode array arranged on a surface of the electro-optic substrate such that the electrodes in the array are spaced closely enough to provide sufficient cross-talk in the presence of an electric field to induce a phase shift along any point in the substrate;
   c) at least one electrode located on an opposite surface of the electro-optic substrate; and
   d) means for independently applying voltages having different voltages, different address times, or combinations thereof to the electrodes in the array to generate a variation in the refractive index profile within the substrate, whereby the temporal and spatial phase are altered, thereby reducing the appearance of speckle.

14. The device claimed in claim 13 wherein the voltage is time varying.

15. The device claimed in claim 13 further comprising means for periodically switching the polarity of the voltage applied to the electrodes.

16. The device claimed in claim 13 wherein the voltage is a time varying analog voltage.

17. The device claimed in claim 13 wherein the voltage is a pulse width modulated voltage.

18. The device claimed in claim 13, wherein there are a plurality of electrodes on the opposite surface and the means for independently applying voltages includes means for independently applying different voltages to the electrodes on the opposite surface.

19. A device for use with a light beam to reduce the appearance of speckle, comprising:
   a) an electro-optic substrate;
   b) an electrode array arranged in an aperiodic array on a surface of the electro-optic substrate
   c) at least one electrode located on the opposite surface of the electro-optic substrate; and
   d) means for independently applying voltages having different voltages, different address times, or combinations thereof to the electrodes in the array to generate variations in the refractive index profile within the substrate, whereby the temporal and spatial phase of a light beam passing through the substrate is altered, thereby reducing the appearance of speckle.

20. The device claimed in claim 19 wherein the voltage is time varying.

21. The device claimed in claim 19 further comprising means for periodically switching the polarity of the voltage applied to the electrodes.

22. The device claimed in claim 19 wherein the voltage is a time varying analog voltage.

23. The device claimed in claim 19 wherein the voltage is a pulse width modulated voltage.

24. The device claimed in claim 19, wherein there are a plurality of electrodes on the opposite surface and the means for independently applying voltages includes means for independently applying different voltages to the electrodes on the opposite surface.

25. A device for use with a light beam to reduce the appearance of speckle, comprising:
   a) a periodically poled electro-optic substrate;
   b) an electrode array arranged on the surface of the electro-optic substrate;
   c) at least one electrode located on an opposite surface of the electro-optic substrate; and
   d) means for independently applying voltages having different voltages, different address times, or combinations thereof to the electrodes in the array to generate a variation in the refractive index profile within the substrate, whereby the temporal and spatial phase of a light beam passing through the substrate is altered, thereby reducing the appearance of speckle.

26. The device claimed in claim 25 wherein the voltage is time varying.

27. The device claimed in claim 25 further comprising means for periodically switching the polarity between electrodes arranged on the surface and the opposite surface of the substrate.

28. The device claimed in claim 25 wherein the voltage is a time varying analog voltage.

29. The device claimed in claim 25 wherein the voltage is pulse width modulated voltage.

30. The device claimed in claim 25, wherein there are a plurality of electrodes on the opposite surface and the means for independently applying voltages includes means for independently applying different voltages to the electrodes on the opposite surface.

31. A device for use with a light beam to reduce the appearance of speckle, comprising:
   a) an aperiodically poled electro-optic substrate;
   b) an electrode array arranged on a surface of the electro-optic substrate;
   c) at least one electrode located on the opposite surface of the electro-optic substrate; and
   d) means for independently applying voltages having different voltages, different address times, or combinations thereof to the electrodes in the array to generate a variation in the refractive index profile within the substrate, whereby the temporal and spatial phase of a light beam passing through the substrate is altered, thereby reducing the appearance of speckle.

32. The device claimed in claim 31 wherein the voltage is time varying.

33. The device claimed in claim 31 further comprising means for periodically switching the polarity between first surface and the opposite surface.

34. The device claimed in claim 31 wherein the voltage is a time varying analog voltage.

35. The device claimed in claim 31 wherein the voltage is a pulse width modulated voltage.

36. The device claimed in claim 31, wherein there are a plurality of electrodes on the opposite surface and the means for independently applying voltages includes means for independently applying different voltages to the electrodes on the opposite surface.

* * * * *